United States Patent
Hyodo et al.

(10) Patent No.: US 11,078,348 B2
(45) Date of Patent: Aug. 3, 2021

(54) RUBBER COMPOSITION FOR TENNIS BALL

(71) Applicant: Sumitomo Rubber Industries, Ltd., Hyogo (JP)

(72) Inventors: Takehiko Hyodo, Kobe (JP); Masanori Taguchi, Kobe (JP); Kazuyoshi Shiga, Kobe (JP); Fumiya Suzuki, Kobe (JP); Hiroaki Tanaka, Kobe (JP); Kunio Niwa, Kobe (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 0 days.

(21) Appl. No.: 16/702,431

(22) Filed: Dec. 3, 2019

(65) Prior Publication Data
US 2020/0190289 A1 Jun. 18, 2020

(30) Foreign Application Priority Data

Dec. 18, 2018 (JP) .............................. JP2018-236311

(51) Int. Cl.
| | | |
|---|---|---|
| *C08L 7/00* | (2006.01) | |
| *A63B 39/02* | (2006.01) | |
| *C08K 3/04* | (2006.01) | |
| *C08K 3/34* | (2006.01) | |
| *C08L 21/00* | (2006.01) | |
| *C08L 9/00* | (2006.01) | |
| *A63B 39/00* | (2006.01) | |

(52) U.S. Cl.
CPC ................. *C08L 7/00* (2013.01); *A63B 39/02* (2013.01); *C08K 3/04* (2013.01); *C08K 3/041* (2017.05); *C08K 3/042* (2017.05); *C08K 3/34* (2013.01); *C08L 9/00* (2013.01); *C08L 21/00* (2013.01); *A63B 2039/006* (2013.01); *A63B 2039/022* (2013.01); *A63B 2209/00* (2013.01); *A63B 2209/02* (2013.01); *C08K 2201/003* (2013.01)

(58) Field of Classification Search
CPC .............. A63B 39/02; A63B 2039/006; A63B 2039/022; A63B 2209/02; A63B 2209/00; C08K 3/041; C08K 3/34; C08K 3/04; C08K 3/042; C08K 2201/003; C08L 7/00; C08L 9/00; C08L 21/00
See application file for complete search history.

(56) References Cited

U.S. PATENT DOCUMENTS

| | | | |
|---|---|---|---|
| 4,592,550 A | 6/1986 | Horiuchi | |
| 6,294,606 B1 * | 9/2001 | Chen | G03G 9/0806 430/137.14 |
| 7,923,491 B2 * | 4/2011 | Weng | C08L 23/283 524/13 |
| 2008/0207821 A1 * | 8/2008 | Weber | C08L 2666/06 524/517 |
| 2019/0126104 A1 * | 5/2019 | Hyodo | A63B 39/02 |

FOREIGN PATENT DOCUMENTS

| | | |
|---|---|---|
| JP | S60-106471 A | 6/1985 |
| JP | S61-143455 A | 7/1986 |
| JP | H10-323408 A | 12/1998 |
| JP | 2004-016532 A | 1/2004 |
| JP | 2008-189885 * | 8/2008 |
| JP | 2011-177369 A | 9/2011 |
| JP | 2011-188877 A | 9/2011 |
| JP | 2011-188878 A | 9/2011 |

OTHER PUBLICATIONS

Machine English translation of JP 2008-189885, Komori, Aug. 2008.*

* cited by examiner

*Primary Examiner* — Patrick D Niland
(74) *Attorney, Agent, or Firm* — Studebaker & Brackett PC

(57) ABSTRACT

A rubber composition for a tennis ball includes a base rubber and a high-flatness filler. The high-flatness filler has an average particle diameter $D_{50}$ of not less than 1 μm and not greater than 50 μm. A degree of flatness DL is not less than 40 and not greater than 200. An amount of the high-flatness filler per 100 parts by weight of the base rubber is not less than 5 parts by weight and not greater than 100 parts by weight. A ratio (E2/E1) of a tensile elastic modulus E2 in a tensile strain range from 70% to 100% to a tensile elastic modulus E1 in a tensile strain range from 10% to 30%, of a vulcanized rubber obtained by vulcanizing the rubber composition, is not less than 0.60 and less than 1.00. The tennis ball includes a hollow core formed from the rubber composition.

12 Claims, 1 Drawing Sheet

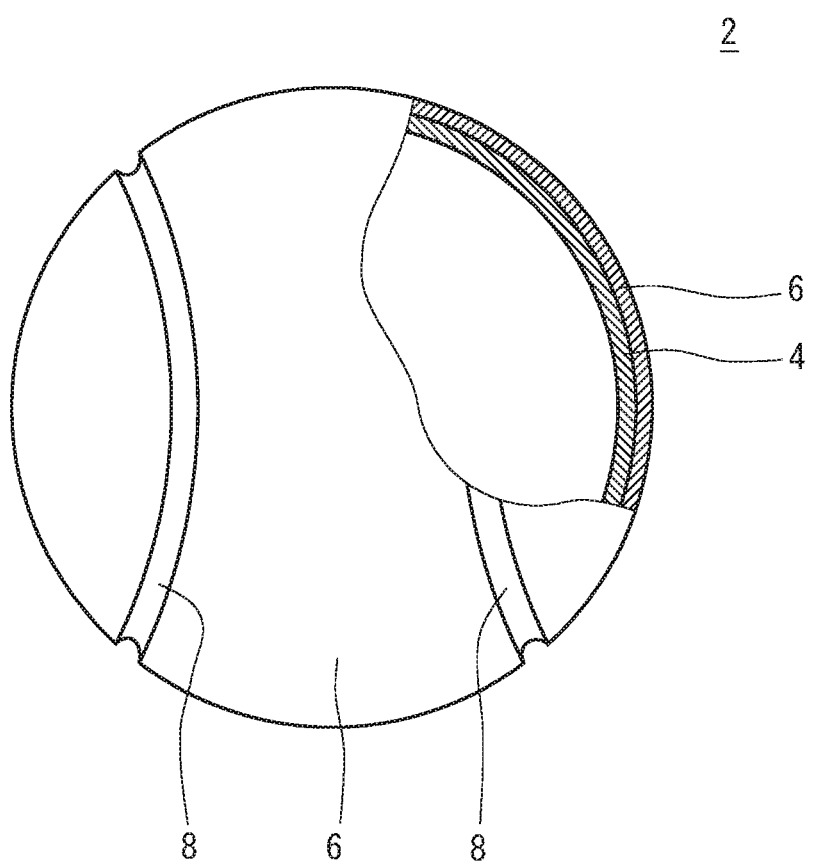

RUBBER COMPOSITION FOR TENNIS BALL

This application claims priority on Patent Application No. 2018-236311 filed in JAPAN on Dec. 18, 2018. The entire contents of this Japanese Patent Application are hereby incorporated by reference.

BACKGROUND OF THE INVENTION

Field of the Invention

The present invention relates to rubber compositions for tennis balls. Specifically, the present invention relates to rubber compositions used for the cores of tennis balls.

Description of the Related Art

A tennis ball includes a core formed from a rubber composition, and felt (melton) covering the core. The core is a hollow sphere. In a tennis ball for use in regulation-ball tennis, the interior of the core is filled with compressed gas having a pressure that is higher than the atmospheric pressure by 40 kPa to 120 kPa. The tennis ball is also referred to as a pressurized tennis ball (pressure ball).

With a pressurized tennis ball, excellent resilience performance and good feel at impact are imparted by the internal pressure of the core, which is higher than the atmospheric pressure. On the other hand, due to the internal pressure of the core being higher than the atmospheric pressure, the filled compressed gas gradually leaks from the core. Due to the leakage of the gas, the internal pressure of the core may decrease to a pressure close to the atmospheric pressure. The tennis ball in which the internal pressure of the core has decreased has inferior resilience performance and feel at impact. Tennis balls having resilience performance and feel at impact that are less changed with time are desired.

In addition, during play, a tennis ball is hit with great force, and bounces on the ground. Upon a hit or upon a bounce, the tennis ball elastically deforms at a high speed. Due to repetition of elastic deformation at a high speed, the properties of the rubber that forms the core deteriorate. The tennis ball in which the rubber properties of the core have deteriorated has inferior resilience performance and feel at impact. For tennis balls, improvement of durability against hits is also desired.

In JP61-143455, a rubber material including a scaly or tabular filler is proposed as a material for preventing leakage of gas. In the rubber material, the scaly or tabular filler inhibits permeation of gas, whereby gas can be prevented from leaking from a core that is formed from the rubber material. However, a tennis ball including the core formed from the rubber material has insufficient durability when being repeatedly hit.

JP2011-188877, JP2011-188878, and JP2011-177369 disclose tennis balls each having a core coated with felt, which is hard to stretch. With these tennis balls, elastic deformation upon a hit is suppressed by the felt, but the durability of a rubber composition that forms the core is not improved.

JP60-106471 discloses a core formed from a rubber composition in which a 1,2-bond-containing polybutadiene and a natural rubber and/or a 1,4-bond-containing high cis-polybutadiene are blended at a predetermined proportion. JP10-323408 discloses a tennis ball in which a core obtained from a rubber composition containing polyamide short fibers with an average fiber diameter not greater than 1 μm is used. JP2004-16532 discloses a tennis ball including a core formed by crosslinking a rubber composition including a complex that is derived from a rubber-polyolefin-nylon ternary copolymer and that contains nylon short fibers.

SUMMARY OF THE INVENTION

The effect of improving durability against hits by base rubber change proposed in JP60-106471 cannot be sufficiently satisfactory. Depending on the amount of polyamide fibers blended into the rubber composition in JP10-323408 and JP2004-16532, the hardness of the rubber composition may be increased, resulting in decrease in feel at impact. Moreover, in the rubber compositions disclosed in JP60-106471, JP10-323408, and JP2004-16532, any countermeasure for prevention of gas leakage is not taken, so that resilience performance and feel at impact may vary with time.

An object of the present invention is to provide a rubber composition for obtaining a tennis ball that has excellent durability against hits and that can maintain appropriate feel at impact and resilience performance over a long period of time.

A rubber composition according to the present invention includes a base rubber and a high-flatness filler. The high-flatness filler has an average particle diameter $D_{50}$ of not less than 1 μm and not greater than 50 μm. A degree of flatness DL obtained by dividing the average particle diameter $D_{50}$ of the high-flatness filler by an average thickness T of the high-flatness filler is not less than 40 and not greater than 200. An amount of the high-flatness filler per 100 parts by weight of the base rubber is not less than 5 parts by weight and not greater than 100 parts by weight. When a tensile elastic modulus, of a vulcanized rubber obtained by vulcanizing the rubber composition, in a tensile strain range from 10% to 30% that is measured at a temperature of 23±1° C. according to JIS K6251, is denoted by E1, and a tensile elastic modulus of the vulcanized rubber in a tensile strain range from 70% to 100% that is measured at a temperature of 23±1° C. according to JIS K6251, is denoted by E2, a ratio (E2/E1) is not less than 0.60 and less than 1.00.

The rubber composition according to the present invention includes a high-flatness filler having a predetermined shape, in an adequate amount. The tensile elastic modulus E1 in the tensile strain range from 10% to 30% of the vulcanized rubber obtained by vulcanizing the rubber composition correlates to the hardness and the impact resilience of a core formed from the vulcanized rubber. The tensile elastic modulus E2 in the tensile strain range from 70% to 100% of the vulcanized rubber influences the amount of deformation upon a hit of a tennis ball including the core. In the vulcanized rubber obtained from the rubber composition, the ratio (E2/E1) of the tensile elastic modulus E2 to the tensile elastic modulus E1 is appropriate. The amount of deformation upon a hit of the tennis ball including the core formed from the vulcanized rubber in which the ratio (E2/E1) is appropriate, is small. In the tennis ball, deterioration of the rubber due to repeated hits is suppressed. The tennis ball has excellent durability against hits. Furthermore, in the core obtained from the rubber composition, owing to the high-flatness filler, feel at impact is not impaired, and gas leakage is prevented. With the rubber composition, a tennis ball that can maintain preferable feel at impact and resilience performance over a long period of time can be obtained.

Preferably, the rubber composition further includes a filler that does not correspond to the high-flatness filler. Preferably, a total amount of the high-flatness filler and the filler that does not correspond to the high-flatness filler, per 100 parts by weight of the base rubber, is not less than 20 parts by weight and not greater than 150 parts by weight.

Preferably, the filler that does not correspond to the high-flatness filler has an average particle diameter $D_{50}$ of not less than 0.01 µm and not greater than 50 µm. Preferably, a proportion of the high-flatness filler to the total amount of the high-flatness filler and the filler that does not correspond to the high-flatness filler is not less than 30% by weight.

Preferably, the filler that does not correspond to the high-flatness filler is selected from the group consisting of silica, carbon black, calcium carbonate, clay, talc, magnesium carbonate, mica, magnesium hydroxide, diatomaceous earth, titanium oxide, zinc oxide, and bismuth oxide.

Preferably, the high-flatness filler is selected from the group consisting of talc, graphites, and graphenes.

Preferably, the base rubber includes a butadiene rubber and a natural rubber. A weight ratio B/N of an amount B of the butadiene rubber to an amount N of the natural rubber in the base rubber is not greater than 1.4.

Preferably, the rubber composition has a nitrogen gas permeability coefficient G at 40° C. of not greater than $1.5 \times 10^{-9}$ ($cm^3 \cdot cm/cm^2/sec/cmHg$).

Preferably, the rubber composition has a sulfur content of not less than 0.01% by weight and not greater than 10% by weight. Preferably, the rubber composition has a Shore A hardness Ha of not less than 20 and not greater than 88.

Preferably, a product EB×Ha of the hardness Ha and elongation at break EB (%) of the rubber composition obtained according to JIS K6251 is not less than 1,000 and not greater than 100,000.

A tennis ball according to the present invention includes a core obtained by using any of the above-described rubber compositions.

BRIEF DESCRIPTION OF THE DRAWINGS

The FIGURE is a partially cutaway cross-sectional view of a tennis ball according to an embodiment of the present invention.

DESCRIPTION OF THE PREFERRED EMBODIMENTS

The following will describe in detail the present invention based on preferred embodiments with appropriate reference to the drawings.

The FIGURE is a partially cutaway cross-sectional view of a tennis ball 2 according to an embodiment of the present invention. The tennis ball 2 has a hollow core 4, two felt portions 6 covering the core 4, and a seam portion 8 positioned in the gap between the two felt portions 6. The thickness of the core 4 is normally about 3 mm to 4 mm. The interior of the core 4 is filled with compressed gas. The two felt portions 6 are attached to the surface of the core 4 by an adhesive.

The core 4 is formed from a rubber composition according to an embodiment of the present invention. The rubber composition includes 100 parts by weight of a base rubber and not less than 5 parts by weight and not greater than 100 parts by weight of a high-flatness filler. In the specification of the present application, the high-flatness filler means a filler that has an average particle diameter $D_{50}$ of not less than 1 µm and not greater than 50 µm and that has a degree of flatness DL of not less than 40 and not greater than 200, the degree of flatness DL being obtained by dividing the average particle diameter $D_{50}$ by the average thickness of the filler.

The high-flatness filler is composed of a large number of flat particles. In the rubber composition, the large number of flat particles that form the high-flatness filler are dispersed in a matrix including the base rubber as a main component. In the specification of the present application, the matrix including the base rubber as a main component is also referred to as a "rubber component".

In the core 4 obtained from the rubber composition, the large number of flat particles dispersed in the matrix as the rubber component inhibit movement of gas molecules therein. In the tennis ball 2 including the core 4, leakage of gas over time is prevented by the large number of flat particles that form the high-flatness filler. The tennis ball 2 can maintain preferable feel at impact and resilience over a long period of time.

Furthermore, in the rubber composition, due to the shapes of the large number of flat particles that form the high-flatness filler, many chemical and/or physical bonds occur at the interface between the high-flatness filler and the rubber component, and thus the so-called interface effect is increased. The increased interface effect improves the adhesion between the high-flatness filler and the rubber component. The rubber composition can be effectively reinforced by the high-flatness filler which adheres well to the rubber component.

For the rubber composition according to the present invention, the tensile properties of a vulcanized rubber obtained by vulcanizing the rubber composition are measured in a specific tensile strain region. Specifically, a tensile elastic modulus E1 in a tensile strain range from 10% to 30% and a tensile elastic modulus E2 in a tensile strain range from 70% to 100% are measured at a temperature of 23±1° C. according to JIS K6251. In the core 4 formed from the vulcanized rubber and the tennis ball 2 including the core 4, the tensile elastic modulus E1 correlates to the hardness and the impact resilience of the core 4, and the tensile elastic modulus E2 correlates to the amount of deformation of the tennis ball 2 upon a hit. As a result of thorough research, the present inventors have found that, by setting the ratio (E2/E1) of the tensile elastic modulus E2 to the tensile elastic modulus E1 to be within an appropriate range, the rubber composition can be reinforced without impairing other properties such as feel at impact, and thus the durability against hits of the obtained tennis ball 2 can be improved. Accordingly, the present inventors have completed the present invention.

Specifically, the ratio (E2/E1) of the tensile elastic modulus E2 in the tensile strain range from 70% to 100% to the tensile elastic modulus E1 in the tensile strain range from 10% to 30%, of the vulcanized rubber obtained by vulcanizing the rubber composition, is not less than 0.60 and less than 1.00. The amount of deformation upon a hit of the tennis ball 2 including the core 4 obtained by using the rubber composition in which the ratio (E2/E1) is not less than 0.60 and less than 1.00, is small. In the tennis ball 2, deterioration of the rubber due to repeated hits is suppressed. The tennis ball 2 has excellent durability against hits. From this viewpoint, the ratio (E2/E1) is preferably not less than 0.62, more preferably not less than 0.63, and particularly preferably not less than 0.65. The method for measuring the tensile elastic moduli E1 and E2 will be described later in EXAMPLES.

In the rubber composition, the tensile elastic modulus E1 is not particularly limited, and is set as appropriate such that the ratio (E2/E1) is within the above-described numerical range. In light of durability against hits, the tensile elastic modulus E1 in the tensile strain range from 10% to 30% is preferably not less than 2.0 MPa and more preferably not less than 2.5 MPa. In light of feel at impact, the tensile elastic modulus E1 is preferably not greater than 7.5 MPa.

In the rubber composition, the tensile elastic modulus E2 is not particularly limited, and is set as appropriate such that the ratio (E2/E1) is within the above-described numerical range. In light of durability against hits, the tensile elastic modulus E2 in the tensile strain range from 70% to 100% is preferably not less than 1.1 MPa and more preferably not less than 1.5 MPa. In light of feel at impact, the tensile elastic modulus E2 is preferably not greater than 5.0 MPa.

The type of the high-flatness filler is not particularly limited as long as the advantageous effects of the present invention are achieved. Examples of the high-flatness filler that has an average particle diameter $D_{50}$ of not less than 1 μm and not greater than 50 μm and that has a degree of flatness DL of not less than 40 and not greater than 200, the degree of flatness DL being obtained by dividing the average particle diameter $D_{50}$ by the average thickness of the high-flatness filler, include talc, graphites, graphenes, carbon fibers, and carbon nanotubes. A high-flatness filler selected from the group consisting of talc, graphites, and graphenes is preferable. Two or more high-flatness fillers may be used in combination.

A more preferable high-flatness filler is talc. Talc is a clay mineral mainly composed of hydrous magnesium silicate represented by $Mg_3Si_4O_{10}(OH)_2$. Typically, talc has a chemical composition that includes 25 to 35% by weight of MgO and 50 to 65% by weight of $SiO_2$. As long as the advantageous effects of the present invention are achieved, part of magnesium may be replaced with aluminum, iron, or the like. Talc having an $Al_2O_3$ content less than 3% by weight, a $Fe_2O_3$ content less than 2% by weight, and a CaO content less than 4% by weight is preferable. Talc may include a small amount of impurities such as calcite ($CaCO_3$), magnesite ($MgCO_3$), and dolomite ($CaMg(CO_3)_2$).

The type of talc is not particularly limited as long as the talc has the above-described average particle diameter $D_{50}$ and the above-described degree of flatness DL. Talc can be selected as appropriate from natural products, processed products of natural products, and synthetic products. Commercially available talc can also be used.

Talc normally has a layered structure in which octahedrons formed by magnesium hydroxide are interposed between tetrahedrons formed by silicon oxide. In talc, the bonding strength between layers is weak. Thus, delamination easily occurs by pulverization, so that particles having a high degree of flatness DL are easily obtained. Therefore, it is also possible to obtain talc having a predetermined shape by pulverizing or granulating natural talc using a known apparatus. For example, in the case with a pulverization method, a dry-type pulverization method such as a grinding-type pulverization method using a roller mill, a Raymond mill, or the like, an impact-type pulverization method using an atomizer, a hammer mill, a micron mill, or the like, and a collision-type pulverization method using a jet mill, a ball mill, or the like, a wet-type pulverization method in which coarsely pulverized talc powder is brought into contact with water and pulverized as a flowable slurry, and the like are selectively used as appropriate. Examples of the apparatus suitable for wet-type pulverization include ball mills, bead mills, wet jet mills, and Discoplex. If necessary, talc having a predetermined shape may be obtained by classification after pulverization.

Normally, a graphene has a single-layer structure in which a large number of carbon atoms are bound to each other in a planar manner, and is also referred to as a graphene sheet. A graphene may include a laminate or an assembly of graphene sheets. In light of prevention of gas leakage, the number of graphene sheets laminated is preferably not greater than 100, more preferably not greater than 50, and particularly preferably not greater than 20.

The method for producing a graphene is not particularly limited. For example, a graphene may be obtained from a graphite, a graphite oxide, or the like by a known method such as a peeling method, a sonication method, a chemical vapor deposition method, an epitaxial growth method, and the like. As long as the object of the present invention is achieved, commercially-available graphenes may be used. Specific examples thereof include trade name "xGnP-M-5" of XG Sciences, trade name "G-12" of EM Japan, trade name "GNP-C1" of Graphene Laboratories, and trade name "iGrafen" of ITEC Co. Ltd.

A graphite is a carbon material obtained by laminating a plurality of graphene sheets such that each of the graphene sheets is slightly shifted from one another, and is also referred to as black lead. The type of and the production method for graphite are not particularly limited. Examples of graphites include natural graphites such as amorphous graphite, flake graphite, vein graphite, crystalline graphite, and the like, expansion graphites and expanded graphites obtained by processing natural graphites, and artificial graphites obtained by thermally treating amorphous carbon. As long as the object of the present invention is achieved, commercially-available graphites may be used. Specific examples thereof include trade names "SFG44", "C-THERM 011", and "P44" of IMERYS, and trade names "CP", "UP", and "GR" of Nippon Graphite Industries, Co., Ltd.

As a carbon nanotube, a single-walled carbon nanotube (SWNT) may be used, a multi-walled carbon nanotube (MWNT) may be used, or a mixture thereof may be used. In addition, the carbon nanotube may be a carbon nanotube having an arm-chair structure, may be a carbon nanotube having a zigzag structure, may be a carbon nanotube having a helical structure, or may be a mixture of these carbon nanotubes.

In light of prevention of gas leakage, the degree of flatness DL of the high-flatness filler obtained by dividing the average particle diameter $D_{50}$ (μm) by the average thickness T (μm) of the high-flatness filler is not less than 40, preferably not less than 50, more preferably not less than 60, and particularly preferably not less than 80. In light of durability against hits, the degree of flatness DL of the high-flatness filler is not greater than 200 and more preferably not greater than 180. When the plurality of flat particles that form the high-flatness filler are aggregated or multilayered to form an assembly, the degree of flatness DL is calculated from an average particle diameter $D_{50}$ and an average thickness T that are obtained through measurement in a state where the assembly is included.

In light of prevention of gas leakage, the average particle diameter $D_{50}$ of the high-flatness filler is not less than 1 μm, preferably not less than 2 μm, more preferably not less than 3 μm, and particularly preferably not less than 5 μm. In light of mixability with the base rubber, the average particle diameter $D_{50}$ is not greater than 50 μm, more preferably not greater than 40 μm, and particularly preferably not greater than 30 μm. In the specification of the present application, the average particle diameter $D_{50}$ (μm) means an average particle diameter at a point of 50% by volume accumulated from the small-diameter side in a particle size distribution measured with a laser diffraction particle size distribution measuring instrument (for example, LMS-3000 manufactured by Seishin Enterprise Co., Ltd.).

The average thickness T of the high-flatness filler is selected as appropriate depending on the type of the high-flatness filler. In light of prevention of gas leakage, the average thickness T of the high-flatness filler is preferably not greater than 1.00 μm, more preferably not greater than 0.50 μm, and particularly preferably not greater than 0.20 μm. In light of mixability with the base rubber, the average thickness T is preferably not less than 0.001 μm, more preferably not less than 0.002 μm, and particularly preferably not less than 0.003 μm. In the specification of the present application, the average thickness T (μm) of the high-flatness filler is measured by observation with a microscope such as a transmission electron microscope. Specifically, particles having a size similar to the average particle diameter $D_{50}$ of the high-flatness filler are selected from an image obtained by observing a plurality of particles taken from the high-flatness filler with a transmission electron microscope (for example, H-9500 manufactured by Hitachi High-Technologies Corporation), and the thicknesses of the particles are measured. The average of measurement values obtained for 12 particles is regarded as the average thickness T of the high-flatness filler.

In light of reinforcement and prevention of gas leakage, the amount of the high-flatness filler per 100 parts by weight of the base rubber is not less than 5 parts by weight, preferably not less than 10 parts by weight, and more preferably not less than 20 parts by weight. In light of feel at impact, the amount of the high-flatness filler is not greater than 100 parts by weight and preferably not greater than 90 parts by weight.

As long as the advantageous effects of the present invention are achieved, the rubber composition can further include a filler that does not correspond to the high-flatness filler. Here, the filler that does not correspond to the high-flatness filler means a filler having a degree of flatness DL less than 40, a filler having a degree of flatness DL greater than 200, a filler having an average particle diameter $D_{50}$ less than 1 μm, or a filler having an average particle diameter $D_{50}$ greater than 50 μm. The filler that does not correspond to the high-flatness filler is preferably selected from the group consisting of silica, carbon black, calcium carbonate, clay, talc, magnesium carbonate, mica, magnesium hydroxide, diatomaceous earth, titanium oxide, zinc oxide, and bismuth oxide. In light of adhesion to the rubber component, carbon-based fillers are preferable, and carbon black is particularly preferable. Two or more such fillers may be used in combination. In the specification of the present application, a carbon-based filler means a filler composed of a large number of particles containing carbon atoms as a main component, and means a filler in which preferably 90% by weight or more, more preferably 95% by weight or more, and particularly preferably 98% by weight or more of the components of the filler are carbon atoms.

The average particle diameter $D_{50}$ of the filler that does not correspond to the high-flatness filler is selected as appropriate depending on the type of the filler. In light of prevention of gas leakage, the average particle diameter $D_{50}$ of the filler that does not correspond to the high-flatness filler is preferably not less than 0.01 μm, more preferably not less than 0.05 μm, and particularly preferably not less than 0.10 μm. In light of feel at impact, the average particle diameter $D_{50}$ of the filler that does not correspond to the high-flatness filler is preferably not greater than 50 μm, more preferably not greater than 30 μm, further preferably not greater than 20 μm, and particularly preferably not greater than 10 μm. The average particle diameter $D_{50}$ (μm) of the filler that does not correspond to the high-flatness filler is measured by the same method as that for the high-flatness filler.

As long as the advantageous effects of the present invention are not impaired, the amount of the filler that does not correspond to the high-flatness filler is not particularly limited. In light of reinforcement, the amount of the filler that does not correspond to the high-flatness filler, per 100 parts by weight of the base rubber, is preferably not less than 15 parts by weight, more preferably not less than 20 parts by weight, and particularly preferably not less than 25 parts by weight. In light of feel at impact, the amount of the filler that does not correspond to the high-flatness filler is preferably not greater than 50 parts by weight, more preferably not greater than 30 parts by weight, and particularly preferably not greater than 20 parts by weight. In the case where two or more such fillers are used in combination, the total amount of these fillers is adjusted to be within the above range.

In the case where the high-flatness filler and the filler that does not correspond to the high-flatness filler are used in combination, in light of reinforcement, the total amount (total blending amount) of the high-flatness filler and the filler that does not correspond to the high-flatness filler, per 100 parts by weight of the base rubber, is preferably not less than 20 parts by weight, more preferably not less than 30 parts by weight, and particularly preferably not less than 50 parts by weight. In light of feel at impact, the total amount is preferably not greater than 150 parts by weight, more preferably not greater than 120 parts by weight, and particularly preferably not greater than 100 parts by weight.

In the case where the high-flatness filler and the filler that does not correspond to the high-flatness filler are used in combination, in light of prevention of gas leakage, the proportion of the high-flatness filler to the total amount (total blending amount) of the high-flatness filler and the filler that does not correspond to the high-flatness filler, is preferably not less than 30% by weight, more preferably not less than 40% by weight, and particularly preferably not less than 50% by weight, and the upper limit of the proportion is 100% by weight.

Examples of preferable base rubbers for the rubber composition according to the present invention include natural rubbers, polybutadienes, polyisoprenes, styrene-butadiene copolymers, acrylonitrile-butadiene copolymers, polychloroprenes, ethylene-propylene copolymers, ethylene-propylene-diene copolymers, isobutylene-isoprene copolymers, and acrylic rubbers. More preferable base rubbers are natural rubbers and polybutadienes. Two or more of these rubbers may be used in combination.

In the case where a natural rubber and a polybutadiene are used in combination, in light of feel at impact and durability, the weight ratio B/N of the amount B of the polybutadiene rubber to the amount N of the natural rubber is preferably not greater than 1.4, more preferably not greater than 1.0, and particularly preferably not greater than 0.4. The entire base rubber may be a natural rubber.

Preferably, the rubber composition further includes a vulcanizing agent, a vulcanization accelerator, and a vulcanization aid. Examples of the vulcanizing agent include: sulfurs such as powdery sulfur, insoluble sulfur, precipitated sulfur, colloidal sulfur, and the like; and sulfur compounds such as morpholine disulfide, alkylphenol disulfide, and the like. The amount of the vulcanizing agent is adjusted in accordance with the type thereof. In light of resilience performance, the amount of the vulcanizing agent per 100 parts by weight of the base rubber is preferably not less than 0.5 parts by weight and more preferably not less than 1.0 part by weight. The amount of the vulcanizing agent is preferably not greater than 5.0 parts by weight.

Examples of suitable vulcanization accelerators include guanidine-based compounds, sulfenamide-based compounds, thiazole-based compounds, thiuram-based compounds, thiourea-based compounds, dithiocarbamic acid-based compounds, aldehyde-amine-based compounds, aldehyde-ammonia-based compounds, imidazoline-based compounds, and xanthate-based compounds. In light of resilience performance, the amount of the vulcanization accelerator per 100 parts by weight of the base rubber is preferably not less than 1.0 part by weight and more preferably not less than 2.0 parts by weight. The amount of the vulcanization accelerator is preferably not greater than 6.0 parts by weight.

Examples of the vulcanization aid include fatty acids such as stearic acid and the like, metal oxides such as zinc oxide and the like, fatty acid metal salts such as zinc stearate and the like. The rubber composition may further include additives such as a coupling agent, an anti-aging agent, an antioxidant, a light stabilizer, a softener, a processing aid, a coloring agent, and the like as long as the advantageous effects of the present invention are not impaired.

Preferably, the rubber composition includes sulfur. The sulfur included in the rubber composition can contribute to formation of a crosslinked structure. The crosslinking density of the rubber composition influences the feel at impact and resilience performance of the tennis ball 2 obtained from this rubber composition. In light of resilience performance, the sulfur content of the rubber composition is preferably not less than 0.01% by weight, more preferably not less than 0.1% by weight, and particularly preferably not less than 1.0% by weight. In light of feel at impact, the sulfur content is preferably not greater than 10% by weight, more preferably not greater than 8% by weight, and particularly preferably not greater than 7% by weight. In the specification of the present application, the sulfur content of the rubber composition is measured according to the oxygen flask combustion method described in GENERAL TESTS, PROCESSES AND APPARATUS in the Japanese Pharmacopoeia 17th Edition. The sulfur included in the rubber composition may be sulfur as a single element, or may be sulfur atoms included in a sulfur compound. The sulfur may be derived from the vulcanizing agent or the vulcanization accelerator.

From the viewpoint that gas leakage from the core 4 is prevented and preferable feel at impact and resilience performance are maintained, a nitrogen gas permeability coefficient G at 40° C. of the rubber material is preferably not greater than $1.5 \times 10^{-9}$ (cm$^3$·cm/cm$^2$/sec/cmHg), more preferably not greater than $1.0 \times 10^{-9}$ (cm$^3$·cm/cm$^2$/sec/cmHg), and particularly preferably not greater than $0.7 \times 10^{-9}$ (cm$^3$·cm/cm$^2$/sec/cmHg). In the specification of the present application, the nitrogen gas permeability coefficient G is measured according to the differential-pressure method described in JIS K7126-1.

In light of suppression of deformation upon a hit and resilience performance, a Shore A hardness Ha of the rubber composition is preferably not less than 20, more preferably not less than 40, and particularly preferably not less than 50. In light of feel at impact, the hardness Ha is preferably not greater than 88, more preferably not greater than 85, and particularly preferably not greater than 80. The hardness Ha is measured with a type A durometer mounted to an automated hardness meter (trade name "digi test II" manufactured by Heinrich Bareiss Prüfgerätebau GmbH). For the measurement, a slab that is formed by hot press and that has a thickness of about 2 mm is used. A slab kept at 23° C. for two weeks is used for the measurement. At the time of measurement, three slabs are stacked.

In light of suppression of deformation upon a hit and resilience performance, the product (EB×Ha) of elongation at break EB (%) and the Shore A hardness Ha of the rubber composition is preferably not less than 1,000, more preferably not less than 2,000, and particularly preferably not less than 5,000. In light of feel at impact, the product (EB×Ha) is preferably not greater than 100,000, more preferably not greater than 80,000, and particularly preferably not greater than 50,000.

The elongation at break EB of the rubber composition is measured according to the description of JIS K6251 "Rubber, vulcanized or thermoplastics-Determination of tensile stress-strain properties". In light of suppression of deformation upon a hit and resilience performance, the elongation at break EB of the rubber composition is preferably not less than 100%, more preferably not less than 200%, and particularly preferably not less than 300%. In light of feel at impact, the elongation at break EB is preferably not greater than 700%.

As long as the object of the present invention is achieved, the method for producing the rubber composition is not particularly limited. For example, the rubber composition may be produced by: putting the base rubber, the high-flatness filler, the filler that does not correspond to the high-flatness filler, additives, etc., as appropriate, into a known kneading machine such as a Banbury mixer, a kneader, a roll, or the like; melt-kneading these materials; then adding the vulcanizing agent, etc., to the obtained kneaded product; and heating and pressing the kneaded product. In the case of adding a carbon-based filler, in light of dispersibility, the carbon-based filler is preferably added to the rubber composition in a state as a master batch obtained by mixing with the base rubber in advance.

The kneading conditions and the vulcanization conditions are selected on the basis of the formula of the rubber composition. The kneading temperature is preferably not lower than 50° C. and not higher than 180° C. The vulcanization temperature is preferably not lower than 140° C. and not higher than 180° C. The vulcanization time is preferably not shorter than 2 minutes and not longer than 60 minutes.

The method for producing the tennis ball 2 by using the rubber composition is not particularly limited. For example, two semi-spherical half shells are formed by vulcanizing and molding the rubber composition in a predetermined mold. The two half shells are attached to each other in a state where an ammonium salt and a nitrite are included in the interior thereof, and then compression molding is performed, whereby the core 4 that is a hollow sphere is formed. Within the core 4, nitrogen gas is generated by chemical reaction of the ammonium salt and the nitrite. By the nitrogen gas, the internal pressure of the core 4 is increased. Next, the felt portions 6 that have been cut in a dumbbell shape and have had seam glue adhered to the cut surfaces thereof in advance are attached to the surface of the core 4, whereby the tennis ball 2 is obtained.

EXAMPLES

The following will show the effects of the present invention by means of Examples, but the present invention should not be construed in a limited manner on the basis of the description of these Examples.

Example 1

80 parts by weight of a natural rubber (trade name "SMR CV60"), 20 parts by weight of a polybutadiene rubber (trade name "BR01", manufactured by JSR Corporation), 66 parts by weight of talc A (trade name "Mistron HAR", manufactured by IMERYS), 5 parts by weight of zinc oxide (trade name "Zinc Oxide II", manufactured by SEIDO CHEMICAL INDUSTRY CO., LTD.), and 0.5 parts by weight of stearic acid (trade name "Tsubaki", manufactured by NOF Corporation) were put into a Banbury mixer and kneaded at 90° C. for 5 minutes therein to obtain a kneaded product. The kneaded product was cooled to 40° C. or lower, and then 3.6 parts by weight of sulfur (trade name "Sanfel EX", manufactured by SANSHIN CHEMICAL INDUSTRY CO., LTD., containing 20% of oil), 1 part by weight of a vulcanization accelerator 1 (trade name "Sanceler D", manufactured by SANSHIN CHEMICAL INDUSTRY CO., LTD.), 1 part by weight of a vulcanization accelerator 2 (trade name "Nocceler CZ", manufactured by Ouchi Shinko Chemical Industrial Co., Ltd.), and 1.88 parts by weight of a vulcanization accelerator 3 (trade name "Nocceler DM", manufactured by Ouchi Shinko Chemical Industrial Co., Ltd.) were added to the kneaded product, and the mixture was kneaded at 50° C. for 3 minutes using an open roll, whereby a rubber composition of Example 1 was obtained.

Examples 2 to 15 and Comparative Examples 1 to 15

Rubber compositions of Examples 2 to 15 and Comparative Examples 1 to 15 were obtained in the same manner as Example 1, except for changing to the compositions shown in Tables 1 to 6 below. In the case of blending a carbon-based filler, 100 parts by weight of the base rubber and 50 parts by weight of the carbon-based filler were kneaded in advance at 90° C. for 5 minutes using a Banbury mixer to prepare a master batch, and the master batch was added such that the compositions shown in Tables 1 to 6 below were achieved, whereby the respective rubber compositions were obtained.

TABLE 1

(parts by weight)

|  | Ex. 1 | Com. Ex. 1 | Com. Ex. 2 | Com. Ex. 3 |
|---|---|---|---|---|
| NR | 80 | 80 | 80 | 80 |
| BR | 20 | 20 | 20 | 20 |
| Talc A (DL100) | 66 | 0 | 0 | 0 |
| Mica (DL90) | 0 | 0 | 0 | 0 |
| Graphite (DL120) | 0 | 0 | 0 | 0 |
| Graphene (DL700) | 0 | 0 | 0 | 0 |
| Talc B (DL30) | 0 | 66 | 0 | 0 |
| Talc C (DL33) | 0 | 0 | 66 | 0 |
| Talc D (DL20) | 0 | 0 | 0 | 66 |
| Clay (DL20) | 0 | 0 | 0 | 0 |
| Magnesium carbonate (DL10) | 0 | 0 | 0 | 0 |
| Carbon black (DL1) | 0 | 0 | 0 | 0 |
| Silica (DL1) | 0 | 0 | 0 | 0 |
| Calcium carbonate (DL1) | 0 | 0 | 0 | 0 |
| Zinc oxide (DL1) | 5 | 5 | 5 | 5 |
| Stearic acid | 0.5 | 0.5 | 0.5 | 0.5 |
| Sulfur | 3.6 | 3.6 | 3.6 | 3.6 |
| Vulcanization accelerator 1 | 1 | 1 | 1 | 1 |
| Vulcanization accelerator 2 | 1 | 1 | 1 | 1 |
| Vulcanization accelerator 3 | 1.88 | 1.88 | 1.88 | 1.88 |
| Total | 178.98 | 178.98 | 178.98 | 178.98 |

TABLE 2

(parts by weight)

|  | Com. Ex. 4 | Ex. 2 | Ex. 3 | Ex. 4 | Com. Ex. 5 |
|---|---|---|---|---|---|
| NR | 80 | 80 | 80 | 80 | 80 |
| BR | 20 | 20 | 20 | 20 | 20 |
| Talc A (DL100) | 160 | 100 | 30 | 10 | 4 |
| Mica (DL90) | 0 | 0 | 0 | 0 | 0 |
| Graphite (DL120) | 0 | 0 | 0 | 0 | 0 |
| Graphene (DL700) | 0 | 0 | 0 | 0 | 0 |
| Talc B (DL30) | 0 | 0 | 0 | 0 | 0 |
| Talc C (DL33) | 0 | 0 | 0 | 0 | 0 |
| Talc D (DL20) | 0 | 0 | 0 | 0 | 0 |
| Clay (DL20) | 0 | 0 | 0 | 0 | 0 |
| Magnesium carbonate (DL10) | 0 | 0 | 0 | 0 | 0 |
| Carbon black (DL1) | 0 | 0 | 0 | 0 | 0 |
| Silica (DL1) | 0 | 0 | 0 | 0 | 0 |
| Calcium carbonate (DL1) | 0 | 0 | 0 | 0 | 0 |
| Zinc oxide (DL1) | 5 | 5 | 5 | 5 | 5 |
| Stearic acid | 0.5 | 0.5 | 0.5 | 0.5 | 0.5 |
| Sulfur | 3.6 | 3.6 | 3.6 | 3.6 | 3.6 |
| Vulcanization accelerator 1 | 1 | 1 | 1 | 1 | 1 |
| Vulcanization accelerator 2 | 1 | 1 | 1 | 1 | 1 |
| Vulcanization accelerator 3 | 1.88 | 1.88 | 1.88 | 1.88 | 1.88 |
| Total | 272.98 | 212.98 | 142.98 | 122.98 | 116.98 |

TABLE 3

(parts by weight)

|  | Ex. 5 | Com. Ex. 6 | Ex. 6 | Ex. 7 | Ex. 8 |
|---|---|---|---|---|---|
| NR | 80 | 80 | 80 | 80 | 80 |
| BR | 20 | 20 | 20 | 20 | 20 |
| Talc A (DL100) | 0 | 0 | 30 | 47 | 34 |
| Mica (DL90) | 0 | 0 | 0 | 0 | 12 |
| Graphite (DL120) | 66 | 0 | 0 | 0 | 0 |
| Graphene (DL700) | 0 | 66 | 0 | 0 | 0 |
| Talc B (DL30) | 0 | 0 | 0 | 0 | 0 |
| Talc C (DL33) | 0 | 0 | 0 | 0 | 0 |
| Talc D (DL20) | 0 | 0 | 0 | 0 | 0 |
| Clay (DL20) | 0 | 0 | 0 | 0 | 40 |
| Magnesium carbonate (DL10) | 0 | 0 | 17 | 7 | 0 |
| Carbon black (DL1) | 0 | 0 | 12 | 0 | 0 |
| Silica (DL1) | 0 | 0 | 4 | 17 | 0 |
| Calcium carbonate (DL1) | 0 | 0 | 0 | 0 | 0 |

TABLE 3-continued (parts by weight)

| | Ex. 5 | Com. Ex. 6 | Ex. 6 | Ex. 7 | Ex. 8 |
|---|---|---|---|---|---|
| Zinc oxide (DL1) | 5 | 5 | 5 | 4 | 3 |
| Stearic acid | 0.5 | 0.5 | 1 | 0 | 0 |
| Sulfur | 3.6 | 3.6 | 3.6 | 3.6 | 3.6 |
| Vulcanization accelerator 1 | 1 | 1 | 1 | 1 | 1 |
| Vulcanization accelerator 2 | 1 | 1 | 1 | 1 | 1 |
| Vulcanization accelerator 3 | 1.88 | 1.88 | 1.88 | 1.88 | 1.88 |
| Total | 178.98 | 178.98 | 176.48 | 182.48 | 196.48 |

TABLE 4

(parts by weight)

| | Ex. 9 | Ex. 10 | Com. Ex. 7 | Com. Ex. 8 | Ex. 11 |
|---|---|---|---|---|---|
| NR | 80 | 80 | 80 | 80 | 80 |
| BR | 20 | 20 | 20 | 20 | 20 |
| Talc A (DL100) | 66 | 30 | 0 | 0 | 0 |
| Mica (DL90) | 0 | 0 | 0 | 66 | 66 |
| Graphite (DL120) | 0 | 0 | 0 | 0 | 0 |
| Graphene (DL700) | 0 | 0 | 0 | 0 | 0 |
| Talc B (DL30) | 0 | 0 | 0 | 0 | 0 |
| Talc C (DL33) | 0 | 0 | 0 | 0 | 0 |
| Talc D (DL20) | 0 | 0 | 0 | 0 | 0 |
| Clay (DL20) | 0 | 0 | 66 | 0 | 0 |
| Magnesium carbonate (DL10) | 0 | 0 | 0 | 0 | 0 |
| Carbon black (DL1) | 30 | 15 | 0 | 0 | 30 |
| Silica (DL1) | 15 | 10 | 0 | 0 | 0 |
| Calcium carbonate (DL1) | 45 | 55 | 0 | 0 | 0 |
| Zinc oxide (DL1) | 5 | 5 | 5 | 5 | 5 |
| Stearic acid | 0.5 | 0.5 | 0.5 | 0.5 | 0.5 |
| Sulfur | 3.6 | 3.6 | 3.6 | 3.6 | 3.6 |
| Vulcanization accelerator 1 | 1 | 1 | 1 | 1 | 1 |
| Vulcanization accelerator 2 | 1 | 1 | 1 | 1 | 1 |
| Vulcanization accelerator 3 | 1.88 | 1.88 | 1.88 | 1.88 | 1.88 |
| Total | 268.98 | 222.98 | 178.98 | 178.98 | 208.98 |

TABLE 5

(parts by weight)

| | Com. Ex. 10 | Com. Ex. 11 | Com. Ex. 12 | Com. Ex. 13 | Com. Ex. 14 |
|---|---|---|---|---|---|
| NR | 80 | 80 | 80 | 80 | 80 |
| BR | 20 | 20 | 20 | 20 | 20 |
| Talc A (DL100) | 0 | 0 | 0 | 0 | 0 |
| Mica (DL90) | 0 | 0 | 0 | 0 | 12 |
| Graphite (DL120) | 0 | 0 | 0 | 0 | 0 |
| Graphene (DL700) | 0 | 0 | 0 | 0 | 0 |
| Talc B (DL30) | 0 | 0 | 0 | 0 | 0 |
| Talc C (DL33) | 0 | 0 | 0 | 0 | 0 |
| Talc D (DL20) | 0 | 0 | 0 | 0 | 0 |
| Clay (DL20) | 0 | 0 | 30 | 0 | 40 |
| Magnesium carbonate (DL10) | 66 | 0 | 17 | 7 | 0 |
| Carbon black (DL1) | 0 | 0 | 12 | 0 | 0 |
| Silica (DL1) | 0 | 0 | 4 | 17 | 0 |
| Calcium carbonate (DL1) | 0 | 66 | 0 | 47 | 34 |
| Zinc oxide (DL1) | 5 | 5 | 5 | 4 | 3 |
| Stearic acid | 0.5 | 0.5 | 1 | 0 | 0 |
| Sulfur | 3.6 | 3.6 | 3.6 | 3.6 | 3.6 |
| Vulcanization accelerator 1 | 1 | 1 | 1 | 1 | 1 |
| Vulcanization accelerator 2 | 1 | 1 | 1 | 1 | 1 |
| Vulcanization accelerator 3 | 1.88 | 1.88 | 1.88 | 1.88 | 1.88 |
| Total | 178.98 | 178.98 | 176.48 | 182.48 | 196.48 |

TABLE 6

(parts by weight)

| | Com. Ex. 15 | Ex. 12 | Ex. 13 | Ex. 14 | Ex. 15 |
|---|---|---|---|---|---|
| NR | 80 | 100 | 50 | 80 | 80 |
| BR | 20 | 0 | 50 | 20 | 20 |
| Talc A (DL100) | 0 | 66 | 66 | 66 | 66 |
| Mica (DL90) | 0 | 0 | 0 | 0 | 0 |
| Graphite (DL120) | 0 | 0 | 0 | 0 | 0 |
| Graphene (DL700) | 0 | 0 | 0 | 0 | 0 |
| Talc B (DL30) | 66 | 0 | 0 | 0 | 0 |
| Talc C (DL33) | 0 | 0 | 0 | 0 | 0 |
| Talc D (DL20) | 0 | 0 | 0 | 0 | 0 |
| Clay (DL20) | 0 | 0 | 0 | 0 | 0 |
| Magnesium carbonate (DL10) | 0 | 0 | 0 | 0 | 0 |
| Carbon black (DL1) | 40 | 0 | 0 | 0 | 0 |
| Silica (DL1) | 0 | 0 | 0 | 0 | 0 |
| Calcium carbonate (DL1) | 0 | 0 | 0 | 0 | 0 |
| Zinc oxide (DL1) | 5 | 3 | 3 | 5 | 5 |
| Stearic acid | 0.5 | 1 | 1 | 0.5 | 0.5 |
| Sulfur | 3.6 | 3.6 | 3.6 | 2 | 10 |
| Vulcanization accelerator 1 | 1 | 1 | 1 | 0.5 | 2 |
| Vulcanization accelerator 2 | 1 | 1 | 1 | 0.5 | 2 |
| Vulcanization accelerator 3 | 1.88 | 1.88 | 1.88 | 0.9 | 3 |
| Total | 218.98 | 177.48 | 177.48 | 175.40 | 188.50 |

The details of the compounds listed in Tables 1 to 6 are as follows.

NR: natural rubber, trade name "SMR CV60"

BR: polybutadiene rubber, trade name "BR01", manufactured by JSR Corporation

Talc A: trade name "Mistron HAR", manufactured by IMERYS, average particle diameter ($D_{50}$): 6.7 μm, degree of flatness (DL): 100

Mica: trade name "SYA-21", manufactured by YAMAGUCHI MICA CO., LTD., average particle diameter ($D_{50}$): 27 μm, degree of flatness (DL): 90

Graphite: trade name "SFG44", manufactured by IMERYS, average particle diameter (D50): 49 μm, degree of flatness (DL): 120

Graphene: trade name "xGnP-M-5", manufactured by XG Sciences, average particle diameter ($D_{50}$): 5 μm, degree of flatness (DL): 700

Talc B: trade name "L-1", manufactured by Nippon Talc Co., Ltd., average particle diameter ($D_{50}$): 5 μm, degree of flatness (DL): 30

Talc C: trade name "K-1", manufactured by Nippon Talc Co., Ltd., average particle diameter ($D_{50}$): 8 μm, degree of flatness (DL): 33

Talc D: trade name "SSS", manufactured by Nippon Talc Co., Ltd., average particle diameter ($D_{50}$): 13 μm, degree of flatness (DL): 20

Clay: kaolin clay, trade name "ECKALITE 120", manufactured by IMERYS, average particle diameter ($D_{50}$): 4 μm, degree of flatness (DL): 20

Magnesium carbonate: trade name "GOLD STAR", manufactured by Konoshima Chemical Co., Ltd., average particle diameter ($D_{50}$): 6 μm, degree of flatness (DL): 10

Carbon black: trade name "SHOBLACK N330", manufactured by Cabot Japan K.K., average particle diameter ($D_{50}$): 0.03 μm, degree of flatness (DL): 1

Silica: trade name "Nipsil VN3", manufactured by Tosoh Silica Corporation, average particle diameter ($D_{50}$): 20 μm, degree of flatness (DL): 1

Calcium carbonate: trade name "BF300", manufactured by SHIRAISHI CALCIUM KAISHA, LTD., average particle diameter ($D_{50}$): 8 μm, degree of flatness (DL): 1

Zinc oxide: trade name "Zinc Oxide II", manufactured by SEIDO CHEMICAL INDUSTRY CO., LTD., average particle diameter ($D_{50}$): 0.6 μm, degree of flatness (DL): 1

Stearic acid: trade name "Tsubaki", manufactured by NOF Corporation

Sulfur: insoluble sulfur, trade name "Sanfel EX", manufactured by SANSHIN CHEMICAL INDUSTRY CO., LTD., containing 20% of oil Vulcanization accelerator 1: 1,3-diphenylguanidine (DPG), trade name "Sanceler D", manufactured by SANSHIN CHEMICAL INDUSTRY CO., LTD.

Vulcanization accelerator 2: N-cyclohexyl-2-benzothiazolyl sulfenamide (CZ), trade name "Nocceler CZ", manufactured by Ouchi Shinko Chemical Industrial Co., Ltd.

Vulcanization accelerator 3: di-2-benzothiazolyl disulfide (MBTS), trade name "Nocceler DM", manufactured by Ouchi Shinko Chemical Industrial Co., Ltd.

[Sulfur Content Measurement]

The sulfur contents of the rubber compositions of Examples 1 to 15 and Comparative Examples 1 to 15 were measured according to the oxygen flask combustion method described in GENERAL TESTS, PROCESSES AND APPARATUS in the Japanese Pharmacopoeia 17th Edition. After 10 mg of each rubber composition was burnt, 55 ml of methanol was added in total, and then 20 ml of a 0.005-mol/l perchloric acid solution was precisely added. The resultant solution was allowed to stand for 10 minutes, and a sulfur content was determined by measuring the obtained solution using ion chromatography (HIC-SP, manufactured by Shimadzu Corporation). The obtained sulfur content (wt. %) is shown in Tables 7 to 12 below.

[Tensile Test]

A No. 3 dumbbell type test piece having a thickness of 2 mm was produced by placing each of the rubber compositions of Examples 1 to 15 and Comparative Examples 1 to 15 into a mold and press-vulcanizing the rubber composition at 160° C. for 2 minutes. A tensile test was carried out at 23±1° C. according to JIS K6251 "Rubber, vulcanized or thermoplastics-Determination of tensile stress-strain properties" to measure tensile elastic moduli at tensile strains of 10%, 30%, 70%, and 100% and elongation at break of each test piece.

Thereafter, a tensile elastic modulus E1 (MPa) in a tensile strain range from 10% to 30% and a tensile elastic modulus E2 in a tensile strain range from 70% to 100% were obtained according to the following (formula 1) and (formula 2).

$$E1=(E_{30}-E_{10})/(30-10) \quad \text{(formula 1)}$$

$$E2=(E100-E70)/(100-70) \quad \text{(formula 2)}$$

$E_{10}$ is the tensile elastic modulus at a tensile strain of 10%, $E_{30}$ is the tensile elastic modulus at a tensile strain of 30%, $E_{73}$ is the tensile elastic modulus at a tensile strain of 70%, and $E_{100}$ is the tensile elastic modulus at a tensile strain of 100%. The obtained tensile elastic moduli E1 and E2 and the ratio (E2/E1) are shown in Tables 7 to 12 below. In addition, the obtained elongation at break is shown as EB (%) in Tables 7 to 12 below.

[Nitrogen Gas Permeability Coefficient Measurement]

A disk-shaped test piece having a thickness of 2 mm and a diameter of 60 mm was prepared using each of the rubber compositions of Examples 1 to 15 and Comparative Examples 1 to 15. A nitrogen gas permeability coefficient ($cm^3 \cdot cm/cm^2/sec/cmHg$) of each test piece in the thickness direction thereof was measured according to JIS K7126-1 "Plastics—Film and sheeting—Determination of gas-transmission rate—Part 1: Differential-pressure method". For the measurement, gas permeation tester "GTR-30ANI" manufactured by GTR TEC Corporation was used. The measurement conditions were: sample temperature: 40° C., transmission cross-sectional area of a measurement cell: 15.2 $cm^2$, and differential pressure: 0.2 MPa. All the measurements were carried out indoor at 23±0.5° C. The obtained nitrogen gas permeability coefficient is shown as $G(\times 10^{-9})$ in Tables 7 to 12 below.

[Hardness]

Three test pieces each having a thickness of 2 mm, a width of 4 mm, and a length of 30 mm were produced by placing each of the rubber compositions of Examples 1 to 15 and Comparative Examples 1 to 15 into a mold and press-vulcanizing the rubber composition at 160° C. for 2 minutes. Each test piece was kept at 23° C. for 2 weeks, and then hardness was measured by pressing an automated hardness meter (the aforementioned "digi test II"), to which a type A durometer was mounted, to three stacked test pieces of each rubber composition according to the standard of "ASTM-D 2240-68". The obtained Shore A hardness is shown as Ha in Tables 7 to 12 below.

[Production of Tennis Ball]

Two half shells (thickness: 3.2±0.4 mm) were formed by placing the rubber composition of Example 1 into a mold and heating the rubber composition at 150° C. for 4 minutes. A spherical core was formed by putting ammonium chloride, sodium nitrite, and water into one of the half shells, then bonding the half shell to the other half shell, and heating the half shells at 150° C. for 4 minutes. Two felt portions having seam glue adhered to the cut surfaces thereof were attached to the surface of the core, whereby a tennis ball (diameter: 65±1 mm) was produced. The internal pressure of the core was 180 kPa. Similarly, tennis balls including cores formed from the rubber compositions of Examples 2 to 15 and Comparative Examples 1 to 15, respectively, were produced.

[Feel at Impact]

50 players hit, with tennis rackets, tennis balls stored under the atmospheric pressure in an environment having an air temperature of 20±2° C. and a relative humidity of 60% for 24 hours after the production, and were asked about feel at impact. The evaluation was categorized as follows on the basis of the number of players who answered, "the feel at impact was good". The results are shown in Tables 7 to 12 below.

A: 40 persons or more
B: 30 to 39 persons
C: 20 to 29 persons
D: 19 persons or less

[Durability Evaluation 1]

The DF values (forward deformation values) of tennis balls stored under the atmospheric pressure in an environment having an air temperature of 20±2° C. and a relative humidity of 60% for 24 hours after the production were measured according to the standard of the International Tennis Federation. Specifically, residual stress was removed by performing conditioning through 1-inch compression three times in each of three directions that pass through the center of the tennis ball and that are orthogonal to each other (an X-axis direction, a Y-axis direction, a Z-axis direction). Thereafter, an amount of deformation (mm) was measured as a DF value when a load of 80.07 N was applied to the tennis ball. At the time of measurement, the temperature was 25° C. An amount of deformation was measured when a load was applied in each of the three directions, the X-axis direction, the Y-axis direction, and the Z-axis direction, and the average of these amounts of deformation was calculated. Thereafter, the same tennis ball was hit with a hammering tester 30 times, and then DF value measurement was carried out again.

The ratio of the difference (DF2−DF1) between an amount of deformation DF2 after the hammering test and an amount of deformation DF1 before the hammering test, to the amount of deformation DF1, was calculated as a change rate (%). The durability against hits of each tennis ball was evaluated with the change rate (%) as an index on the basis of the following criteria. The evaluation results are shown as durability 1 in Tables 7 to 12 below.

A: less than 5.0%
B: not less than 5.0% and less than 15.0%
C: not less than 15.0% and less than 25.0%
D: not less than 25.0%

[Durability Evaluation 2]

Tennis balls stored under the atmospheric pressure in an environment having an air temperature of 20±2° C. and a relative humidity of 60% for 24 hours after the production, and tennis balls stored under the same conditions for 3 months, were measured for internal pressure (difference from the atmospheric pressure). The ratio (internal pressure reduction rate (%)) of the internal pressure of the tennis ball after 3-month storage to the internal pressure of the tennis ball after 24-hour storage was calculated, and the durability (difficulty in reduction of internal pressure) was evaluated on the basis of the following criteria. The evaluation results are shown as durability 2 in Tables 7 to 12 below.

A: less than 15%
B: not less than 15% and less than 20%
C: not less than 20% and less than 25%
D: not less than 25%

TABLE 7

|  | Ex. 1 | Com. Ex. 1 | Com. Ex. 2 | Com. Ex. 3 |
|---|---|---|---|---|
| Amount of high-flatness filler (phr) | 66 | 0 | 0 | 0 |
| Filler total amount (phr) | 71 | 71 | 71 | 71 |
| Proportion of high-flatness filler (wt. %) | 93 | 0 | 0 | 0 |
| Sulfur content (wt. %) | 2.15 | 2.15 | 2.15 | 2.15 |
| B/N | 0.25 | 0.25 | 0.25 | 0.25 |
| E1 (MPa) | 4.81 | 5.06 | 4.76 | 4.34 |
| E2 (MPa) | 3.26 | 2.81 | 2.75 | 2.31 |
| E2/E1 | 0.68 | 0.56 | 0.58 | 0.53 |
| G (×10$^{-9}$) | 0.671 | 0.731 | 0.739 | 0.730 |
| Hardness Ha (Shore A) | 69 | 70 | 67 | 67 |
| EB (%) | 435 | 411 | 543 | 348 |
| EB × Ha | 30015 | 28770 | 36381 | 23316 |
| Feel at impact | A | A | A | A |
| Durability 1 | A | C | C | C |
| Durability 2 | A | B | B | B |

TABLE 8

|  | Com. Ex. 4 | Ex. 2 | Ex. 3 | Ex. 4 | Com. Ex. 5 |
|---|---|---|---|---|---|
| Amount of high-flatness filler (phr) | 160 | 100 | 30 | 10 | 4 |
| Filler total amount (phr) | 165 | 105 | 35 | 15 | 9 |
| Proportion of high-flatness filler (wt. %) | 97 | 95 | 86 | 67 | 44 |
| Sulfur content (wt. %) | 1.41 | 1.81 | 2.69 | 3.13 | 3.29 |
| B/N | 0.25 | 0.25 | 0.25 | 0.25 | 0.25 |
| E1 (MPa) | 7.70 | 5.57 | 2.63 | 2.20 | 2.01 |
| E2 (MPa) | 3.53 | 3.39 | 1.65 | 1.36 | 1.19 |
| E2/E1 | 0.46 | 0.61 | 0.63 | 0.62 | 0.59 |
| G (×10$^{-9}$) | 0.461 | 0.546 | 0.701 | 1.223 | 1.504 |
| Hardness Ha (Shore A) | 86 | 81 | 56 | 47 | 46 |
| EB (%) | 157 | 172 | 445 | 501 | 525 |
| EB × Ha | 13502 | 13932 | 24920 | 23547 | 24150 |

TABLE 8-continued

|  | Com. Ex. 4 | Ex. 2 | Ex. 3 | Ex. 4 | Com. Ex. 5 |
|---|---|---|---|---|---|
| Feel at impact | C | A | A | A | A |
| Durability 1 | C | B | B | B | C |
| Durability 2 | A | A | B | C | D |

TABLE 9

|  | Ex. 5 | Com. Ex. 6 | Ex. 6 | Ex. 7 | Ex. 8 |
|---|---|---|---|---|---|
| Amount of high-flatness filler (phr) | 66 | 0 | 30 | 47 | 46 |
| Filler total amount (phr) | 71 | 71 | 68 | 75 | 89 |
| Proportion of high-flatness filler (wt. %) | 93 | 0 | 44 | 63 | 52 |
| Sulfur content (wt. %) | 2.15 | 2.15 | 2.18 | 2.11 | 1.96 |
| B/N | 0.25 | 0.25 | 0.25 | 0.25 | 0.25 |
| E1 (MPa) | 4.62 | 7.37 | 3.48 | 4.51 | 3.34 |
| E2 (MPa) | 3.25 | 3.34 | 2.13 | 2.78 | 2.01 |
| E2/E1 | 0.70 | 0.45 | 0.61 | 0.62 | 0.60 |
| G ($\times 10^{-9}$) | 0.619 | 0.396 | 0.930 | 0.691 | 0.811 |
| Hardness Ha (Shore A) | 82 | 86 | 71 | 77 | 68 |
| EB (%) | 323 | 368 | 261 | 386 | 397 |
| EB × Ha | 26486 | 31648 | 18531 | 29722 | 26996 |
| Feel at impact | B | C | A | A | A |
| Durability 1 | B | C | B | B | B |
| Durability 2 | A | A | C | B | B |

TABLE 10

|  | Ex. 9 | Ex. 10 | Com. Ex. 7 | Com. Ex. 8 | Ex. 11 |
|---|---|---|---|---|---|
| Amount of high-flatness filler (phr) | 66 | 30 | 0 | 66 | 66 |
| Filler total amount (phr) | 161 | 115 | 71 | 71 | 101 |
| Proportion of high-flatness filler (wt. %) | 41 | 26 | 0 | 93 | 65 |
| Sulfur content (wt. %) | 1.43 | 1.73 | 2.15 | 2.15 | 1.84 |
| B/N | 0.25 | 0.25 | 0.25 | 0.25 | 0.25 |
| E1 (MPa) | 7.35 | 4.47 | 3.07 | 3.22 | 4.71 |
| E2 (MPa) | 4.89 | 2.81 | 1.55 | 1.52 | 2.87 |
| E2/E1 | 0.66 | 0.63 | 0.51 | 0.47 | 0.61 |
| G ($\times 10^{-9}$) | 0.736 | 0.775 | 0.909 | 0.851 | 0.784 |
| Hardness Ha (Shore A) | 83 | 76 | 66 | 70 | 82 |
| EB (%) | 164 | 183 | 204 | 233 | 192 |
| EB × Ha | 13612 | 13908 | 13464 | 16310 | 15744 |
| Feel at impact | B | A | A | A | B |
| Durability 1 | B | B | C | C | B |
| Durability 2 | B | B | C | B | B |

TABLE 11

|  | Com. Ex. 10 | Com. Ex. 11 | Com. Ex. 12 | Com. Ex. 13 | Com. Ex. 14 |
|---|---|---|---|---|---|
| Amount of high-flatness filler (phr) | 0 | 0 | 0 | 0 | 12 |
| Filler total amount (phr) | 71 | 71 | 68 | 75 | 89 |
| Proportion of high-flatness filler (wt. %) | 0 | 0 | 0 | 0 | 14 |
| Sulfur content (wt. %) | 2.15 | 2.15 | 2.18 | 2.11 | 1.96 |
| B/N | 0.25 | 0.25 | 0.25 | 0.25 | 0.25 |
| E1 (MPa) | 1.24 | 2.64 | 3.29 | 2.72 | 3.40 |
| E2 (MPa) | 1.21 | 1.42 | 1.90 | 1.55 | 1.46 |
| E2/E1 | 0.98 | 0.54 | 0.58 | 0.57 | 0.43 |
| G ($\times 10^{-9}$) | 1.700 | 1.800 | 1.240 | 0.728 | 0.923 |
| Hardness Ha (Shore A) | 65 | 58 | 70 | 74 | 65 |
| EB (%) | 465 | 279 | 278 | 362 | 408 |
| EB × Ha | 30225 | 16182 | 19460 | 26788 | 26520 |
| Feel at impact | A | A | A | A | A |
| Durability 1 | C | C | C | C | C |
| Durability 2 | D | D | C | B | C |

TABLE 12

|  | Com. Ex. 15 | Ex. 12 | Ex. 13 | Ex. 14 | Ex. 15 |
|---|---|---|---|---|---|
| Amount of high-flatness filler (phr) | 0 | 66 | 66 | 66 | 66 |
| Filler total amount (phr) | 111 | 69 | 69 | 71 | 71 |
| Proportion of high-flatness filler (wt. %) | 0 | 96 | 96 | 93 | 93 |
| Sulfur content (wt. %) | 1.76 | 2.17 | 2.17 | 1.18 | 5.12 |
| B/N | 0.25 | 0.00 | 1.00 | 0.25 | 0.25 |
| E1 (MPa) | 5.34 | 5.57 | 4.34 | 4.14 | 4.98 |
| E2 (MPa) | 4.53 | 3.68 | 2.81 | 2.77 | 3.33 |
| E2/E1 | 0.85 | 0.66 | 0.65 | 0.67 | 0.67 |
| G ($\times 10^{-9}$) | 1.011 | 0.619 | 1.062 | 0.705 | 0.663 |
| Hardness Ha (Shore A) | 86 | 70 | 67 | 66 | 71 |
| EB (%) | 176 | 464 | 435 | 491 | 386 |
| EB × Ha | 15136 | 32480 | 29145 | 32406 | 27406 |
| Feel at impact | C | A | A | A | A |
| Durability 1 | C | B | B | B | B |
| Durability 2 | C | A | C | B | B |

As shown in Tables 7 to 12, with the rubber compositions of the Examples, as compared to the rubber compositions of the Comparative Examples, the feel at impact was not greatly impaired, durability 1 against hits was improved, and reduction in the internal pressure of the core was suppressed. From the evaluation results, advantages of the present invention are clear.

The rubber composition described above is also applicable to production of various hollow balls filled with compressed gas. The above descriptions are merely illustrative examples, and various modifications can be made without departing from the principles of the present invention.

What is claimed is:

1. A rubber composition for a tennis ball, the rubber composition including a base rubber and a high-flatness filler, wherein
    the high-flatness filler has an average particle diameter $D_{50}$ of not less than 1 μm and not greater than 50 μm,
    a degree of flatness DL obtained by dividing the average particle diameter $D_{50}$ by an average thickness T of the high-flatness filler is not less than 40 and not greater than 200,
    an amount of the high-flatness filler per 100 parts by weight of the base rubber is not less than 5 parts by weight and not greater than 100 parts by weight, and
    when a tensile elastic modulus, of a vulcanized rubber obtained by vulcanizing the rubber composition with sulfur, in a tensile strain range from 10% to 30% that is measured at a temperature of 23±1° C. according to JIS K6251, is denoted by E1, and a tensile elastic modulus of the vulcanized rubber in a tensile strain range from 70% to 100% that is measured at a temperature of 23±1° C. according to JIS K6251, is denoted by E2, a ratio (E2/E1) is not less than 0.60 and less than 1.00.

2. The rubber composition according to claim 1, further including a filler that does not correspond to the high-flatness filler, wherein
a total amount of the high-flatness filler and the filler that does not correspond to the high-flatness filler, per 100 parts by weight of the base rubber, is not less than 20 parts by weight and not greater than 150 parts by weight.

3. The rubber composition according to claim 2, wherein the filler that does not correspond to the high-flatness filler has an average particle diameter $D_{50}$ of not less than 0.01 μm and not greater than 50 μm.

4. The rubber composition according to claim 2, wherein a proportion of the high-flatness filler to the total amount of the high-flatness filler and the filler that does not correspond to the high-flatness filler is not less than 30% by weight.

5. The rubber composition according to claim 2, wherein the filler that does not correspond to the high-flatness filler is selected from the group consisting of silica, carbon black, calcium carbonate, clay, talc, magnesium carbonate, mica, magnesium hydroxide, diatomaceous earth, titanium oxide, zinc oxide, and bismuth oxide.

6. The rubber composition according to claim 1, wherein the high-flatness filler is selected from the group consisting of talc, graphites, and graphenes.

7. The rubber composition according to claim 1, wherein the base rubber includes a butadiene rubber and a natural rubber, and a weight ratio B/N of an amount B of the butadiene rubber to an amount N of the natural rubber in the base rubber is not greater than 1.4.

8. The rubber composition according to claim 1, wherein the rubber composition has a nitrogen gas permeability coefficient G at 40° C. of not greater than $1.5 \times 10^{-9}$ ($cm^3 \cdot cm/cm^2/sec/cmHg$).

9. The rubber composition according to claim 1, wherein the rubber composition has a sulfur content of not less than 0.01% by weight and not greater than 10% by weight.

10. The rubber composition according to claim 1, wherein the rubber composition has a Shore A hardness Ha of not less than 20 and not greater than 88.

11. The rubber composition according to claim 1, wherein a product EB×Ha of the hardness Ha and elongation at break EB (%) of the rubber composition obtained according to JIS K6251 is not less than 1,000 and not greater than 100,000.

12. A tennis ball comprising a core formed from the rubber composition according to claim 1.

* * * * *